United States Patent
McCoy et al.

(10) Patent No.: US 9,848,221 B2
(45) Date of Patent: *Dec. 19, 2017

(54) METHOD AND INFRASTRUCTURE FOR SYNCHRONIZED STREAMING OF CONTENT

(71) Applicants: Sony Corporation, Tokyo (JP); Sony Network Entertainment International LLC, Los Angeles, CA (US)

(72) Inventors: Charles McCoy, Coronado, CA (US); True Xiong, San Diego, CA (US); Ling Jun Wong, Champaign, IL (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,092

(22) Filed: Mar. 18, 2015

(65) Prior Publication Data

US 2015/0195590 A1    Jul. 9, 2015

Related U.S. Application Data

(62) Division of application No. 13/428,855, filed on Mar. 23, 2012, now Pat. No. 8,997,169.

(51) Int. Cl.
*H04N 7/16*     (2011.01)
*H04N 21/242*   (2011.01)
(Continued)

(52) U.S. Cl.
CPC .......... *H04N 21/242* (2013.01); *H04N 5/932* (2013.01); *H04N 5/935* (2013.01);
(Continued)

(58) Field of Classification Search
CPC .... H04N 1/242; H04N 1/654; H04N 1/25841; H04N 1/25866; H04N 1/42202;
(Continued)

(56) References Cited

U.S. PATENT DOCUMENTS 7,792,158 B1    9/2010  Cho et al.
7,827,479 B2    11/2010 Kali
(Continued)

FOREIGN PATENT DOCUMENTS

WO    2011010345    1/2011
WO    2011059700    5/2011

OTHER PUBLICATIONS

Francois Daoust et al., Summary of the Second W3C Web and TV Workshop. http://www.W3.org/2010/11/web-and-tv/summary. Feb. 8 and 9, 2011.
(Continued)

*Primary Examiner* — Oschta Montoya
(74) *Attorney, Agent, or Firm* — Mayer & Williams PC

(57) ABSTRACT

Systems and methods for synchronizing the playback of network media across multiple content playback devices, termed herein as "playback devices", "clients", or "client devices". In one implementation, client devices are controlled to parse and buffer media content separately. Once all clients are ready, a controller may cause the client devices to start in a synchronized fashion based on signals sent by the controller. The controller adjusts the timing of the signal so that the outputs are displayed in synchronization on each client device. In other implementations, device lag times may be measured. In still other implementations, a master device may synchronize playback of media content on slave devices. In yet other implementations, devices may buffer and join playback of media content occurring on other devices. In further implementations, the systems and meth-
(Continued)

ods may be expanded to include steps of processing authentication for service providers prior to arranging synchronized playback.

13 Claims, 11 Drawing Sheets

(51) Int. Cl.
| | |
|---|---|
| *H04N 21/654* | (2011.01) |
| *H04N 21/258* | (2011.01) |
| *H04N 21/422* | (2011.01) |
| *H04N 21/43* | (2011.01) |
| *H04N 21/44* | (2011.01) |
| *H04N 21/442* | (2011.01) |
| *H04N 21/61* | (2011.01) |
| *H04N 21/658* | (2011.01) |
| *H04N 5/932* | (2006.01) |
| *H04N 5/935* | (2006.01) |
| *H04N 21/41* | (2011.01) |
| *H04N 21/472* | (2011.01) |
| *H04N 21/643* | (2011.01) |
| *H04N 21/858* | (2011.01) |

(52) U.S. Cl.
CPC . *H04N 21/25816* (2013.01); *H04N 21/25841* (2013.01); *H04N 21/25866* (2013.01); *H04N 21/4122* (2013.01); *H04N 21/42202* (2013.01); *H04N 21/42203* (2013.01); *H04N 21/4302* (2013.01); *H04N 21/4307* (2013.01); *H04N 21/44004* (2013.01); *H04N 21/44209* (2013.01); *H04N 21/47202* (2013.01); *H04N 21/6125* (2013.01); *H04N 21/6175* (2013.01); *H04N 21/64322* (2013.01); *H04N 21/654* (2013.01); *H04N 21/6582* (2013.01); *H04N 21/8586* (2013.01)

(58) Field of Classification Search
CPC ............. H04N 1/42203; H04N 1/4302; H04N 1/44004; H04N 1/44209; H04N 1/6125; H04N 1/6175; H04N 1/6582; H04N 1/4307; H04N 1/25816; H04N 1/4122; H04N 1/47202; H04N 1/64322; H04N 1/8586; H04N 5/932; H04N 5/935
See application file for complete search history.

(56) References Cited

U.S. PATENT DOCUMENTS

| | | | |
|---|---|---|---|
| 7,996,566 | B1 | 8/2011 | Sylvain et al. |
| 8,037,220 | B2 | 10/2011 | Moore et al. |
| 8,261,314 | B2 | 9/2012 | Riha |
| 8,340,654 | B2 | 12/2012 | Bratton et al. |
| 8,707,382 | B2 * | 4/2014 | Wollmershauser .. H04N 21/242 725/133 |
| 2004/0015985 | A1 * | 1/2004 | Kweon ................. H04N 7/163 725/30 |
| 2005/0244012 | A1 | 11/2005 | Asada |
| 2005/0265559 | A1 | 12/2005 | Asada |
| 2006/0002681 | A1 | 1/2006 | Spilo et al. |
| 2006/0149850 | A1 | 7/2006 | Bowman |
| 2008/0137690 | A1 | 6/2008 | Krantz et al. |
| 2008/0177822 | A1 * | 7/2008 | Yoneda ................. H04L 12/282 709/202 |
| 2008/0187282 | A1 | 8/2008 | Brady et al. |
| 2009/0310027 | A1 | 12/2009 | Fleming |
| 2010/0111491 | A1 | 5/2010 | Kamoto |
| 2011/0040981 | A1 | 2/2011 | Lindahl et al. |
| 2011/0154417 | A1 | 6/2011 | Civaniar et al. |
| 2012/0082424 | A1 | 4/2012 | Hubner et al. |
| 2013/0067116 | A1 | 3/2013 | Ostergren |
| 2013/0174204 | A1 * | 7/2013 | Coburn, IV ..... H04N 21/43615 725/81 |

OTHER PUBLICATIONS

John Moulding, IBC Watch: Civolution and Second Screen Synchronization. http://www.v-net.tv/newsdisplay.aspx?id=57. Aug. 24, 2011.

Abstract. Ishan Vaishnavia et al., From IPTV to Synchronous Shared Experiences Challenges in Design: Distributed Media Synchronization. http://www.sciencedirect.com/science/article/pii/S0923596511000154. Mar. 26, 2011.

Abstract. H. Melvin et al., Playback Synchronization Techniques for Networked Home Appliances. http://ieeexplore.ieee.org/xpl/freeabs_all.jsp?arnumber=4146056. Jan. 10-14, 2007.

Abstract. M. Sullivan et al., A Protocol for Simultaneous Real Time Playback and Full quality Storage of Streaming Media. https://mospace.umsystem.edu/xmlui/handle/10355/10518. 2010.

Product literature. Avega Systems. http://www.avegasystems.com/_documents/Avega_Aios_Cisco_CES2009.pdf. Jan. 2009.

* cited by examiner

METHOD AND INFRASTRUCTURE FOR SYNCHRONIZED STREAMING OF CONTENT

CROSS REFERENCE TO RELATED APPLICATION

This application is a divisional application of U.S. application Ser. No. 13/428,855, filed Mar. 23, 2012 entitled "SYSTEM, METHOD, AND INFRASTRUCTURE FOR SYNCHRONIZED STREAMING OF CONTENT", now U.S. Pat. No. 8,997,169 issued Mar. 31, 2015, which is owned by the assignee of the present application and is incorporated by reference herein.

BACKGROUND

Infrastructures exist to provide Internet video from various service providers or services. For example, the Sony Bravia® Internet Link ("BIVL") technology from Sony Corporation provides a hardware device which when coupled to a broadband Internet connection allows access to Internet video services through a management server infrastructure. Such infrastructures deliver recorded audiovisual media content such as video, audio, and image files.

Streaming refers to a delivery of media content in a constant fashion, from a transmission at a source to a reception and presentation at a receiver. For example, Internet delivery of digital content presentations to network computers is commonly streamed, as is Internet television content.

With the proliferation of Internet video connected devices, it is common to have several devices playing back the same program, either pre-recorded or live. For example, in a home, the viewer may have two devices in separate rooms, such that the viewer can travel from room-to-room while watching the program. Such is even more common in a sports bar, where many TVs may be streaming the same sporting event. While useful for allowing many viewers to watch the event, such situations commonly experience synchronization problems due to network lag, the source of the signal, and even the model of playback device, e.g., type of IPTV. The problem is accentuated in such situations because viewers will hear a first audio signal from one device and then hear echoes from others. For traditional network media playback, even more serious timing issues may ensue as each playback is started by a device independent of any other playback of the content.

In one prior art attempt to remedy this situation, some recent devices have included in an "advanced mode" menu the capability to allow the user to manually specify the timing to compensate for lag. Such has a disadvantage that most users have no way of measuring lag, which is commonly measured in milliseconds, and so will end up setting the value by trial and error, if such is attempted at all.

SUMMARY

Systems and methods according to the principles described here involve synchronizing the playback of network media across multiple content playback devices, occasionally termed herein as "playback devices", "clients", or "client devices". In one implementation, client devices are controlled to parse and buffer media content separately. Once all clients are ready, a controller may cause the client devices to start in a synchronized fashion based on signals sent by the controller. The controller adjusts the timing of the signal so that the outputs are displayed in synchronization on each client device.

In another implementation, a device lag is measured between the generation or output of a signal and the final display or playback of that signal to the user. The lag may be compensated for to allow better playback synchronization. Besides lags due to the device characteristics, lags may also be measured and compensated for relating to network delays in obtaining content.

In a further implementation, if a first playback device is playing back content, systems and methods according to the principles described here allow for a second playback device to become synchronized with the first, such that playback of the content item on the second is synchronized to the playback on the first. The second content playback device may begin to buffer content prior to display, and may estimate which content to buffer based on a determined playback point on the first playback device, as well as network bandwidth and network and device lag. Once the second playback device has buffered sufficient content such that playback can begin in a synchronized fashion, playback begins and the first and second playback devices are in sync.

In yet another implementation, systems and methods according to the principles described here include setting up a master and slave relationship between two devices, so that the output of the slave device is the same content as the output of the master device. The playback between the two may be synchronized. The master device need not playback the content itself, and may in fact be playing back other content. The source of content may be the master device, e.g., via a tuner, or the source may be upstream of the master device, with the master device just providing throughput of the content. The master device may encode or encrypt the content item for subsequent transmission as need be. In some cases the master device may authenticate a slave device. A common use is when a content item is downloaded or streamed onto the master device, a slave device wishing to sync and playback the same content may need to be authenticated so that it has 1) permission, and 2) capabilities to support playback of that content (e.g., can support 3D, Dolby plus codec, etc.). A service provider can mark its content as "redistributable" or otherwise shared.

In yet another implementation, access to some network content is such that client playback devices play content items after authentication of the playback devices with one or both of a management server and a service provider. In these implementations, synchronized playback may be afforded using certain above synchronization steps as well as content access steps, e.g., affiliation steps with the service provider.

In one aspect, the invention is directed towards a method of synchronizing playback of IPTV content between a first content playback device and a second content playback device, including: coupling first and second content playback devices to a controller, the controller configured to control playback of a content item from a service provider on the first and second content playback device; sending data about a device lag time associated with at least one of the first and second content playback devices to the controller; calculating a time differential between a start time associated with the first content playback device and a start time associated with the second content playback device, the time differential at least partially based on the device lag time; and sending signals to the first and second content playback devices to begin playback of the content item, such that the first and second content playback devices begin playback of the content item at substantially the same time.

Implementations of the invention may include one or more of the following. The sending of signals to the first and second content playback device may be separated by the time differential. The signals sent to the first and second content playback devices may include data indicating to the first and second content playback devices a respective delay after which playback should begin. The delay may be between zero and the time differential. The controller may be within the first or second content playback device. The controller may be in data communication with a local network associated with the first or second content playback device. The method may further include accessing a management server in data communication with the first and second content playback devices, the management server controlling access to the service provider, and where the controller is in data communication with the management server. The controller may be configured to receive geographic data about a location of the first and second content playback devices, and the calculating a time differential may be further based on the geographic location of the first and second content playback devices. The method may further include determining a network lag time by sending a signal from the first or second content playback device, or both, to the management server, and the time differential may be further based on the network lag time.

In another aspect, the invention is directed towards a non-transitory computer-readable medium, including instructions for causing a computing device to implement the above method.

In a further aspect, the invention is directed towards a method of determining a device lag time, including: generating a test signal; sending the test signal to initiate a signal indicating that rendering of a content item should begin; detecting the rendering of the content item; and measuring a time between the sending and the detecting to calculate a device lag time.

Implementations of the invention may include one or more of the following. The method may further include sending the device lag time to a controller. The rendering of a content item may cause a change in brightness or volume. The detecting may include detecting with a microphone or an optical sensor.

In another aspect, the invention is directed towards a non-transitory computer-readable medium, including instructions for causing a computing device to implement the above method.

In yet another aspect, the invention is directed towards a method of synchronizing playback of IPTV content between a first content playback device and a second content playback device, including: playing back a content item on a first content playback device; buffering but not playing back the content item on a second content playback device, the buffering but not playing back occurring at least until the buffer includes a portion of the content item currently being played back on the first content playback device; and sending a signal to begin playback of the content item on the second content playback device, such that the playback of the content item on the first and second content playback devices is synchronized.

Implementations of the invention may include one or more of the following. The first and second content playback devices may be in data communication with a controller, and the method may further include: sending data about a device lag time associated with the second content playback device to the controller; and sending a signal to the second content playback device to begin playback of the partially buffered content item, the time of the sending a signal based on the device lag time. The buffering may be in response to a request from the second content playback device to join the playback of the content item.

In another aspect, the invention is directed towards a non-transitory computer-readable medium, including instructions for causing a computing device to implement the above method.

In yet another aspect, the invention is directed towards a method of playback of at least a portion of a content item on a second content playback device based on a presence of the content item at a first content playback device, including: at least partially receiving a content item on a first content playback device; transmitting at least a portion of the received content item to a second content playback device; and encoding or encrypting the content item by the first content playback device prior to the transmitting.

Implementations of the invention may include one or more of the following. The first content playback device may generate a portion of the content item using a tuner. The first content playback device may have received a portion of the content item from another content playback device. The method may further include controlling operation of the first content playback device using the second content playback device. The transmitting may be performed immediately upon the receiving. The method may further include receiving device or network lag information at the first content playback device, and the transmitting may be performed following a time differential based on the received device or network lag information. The transmitting may be performed while the first content playback device is playing back the content item, playing back another content item, or not playing a content item. The transmitting may be performed while the first content playback device is playing back the content item, and the transmitting may be performed such that the second content playback device plays back the content item in synchronization with the first content playback device. Multiple second content playback devices may be in data communication with the first content playback device, and the method may further include selecting a second content playback device to receive the content item prior to the transmitting. A plurality of second content playback devices may be in data communication with the first content playback device, and the method may further include transmitting the content item to the plurality of second content playback devices. A plurality of second content playback devices are in data communication with the first content playback device, and the method may further include transmitting the content item using a multicasting method to the plurality of second content playback devices. A plurality of second content playback devices may be in data communication with the first content playback device, and the method may further include: at least partially receiving another content item on the first content playback device; and transmitting at least a portion of the received content item to one content playback device of the plurality and transmitting at least a portion of the received another content item to another content playback device of the plurality.

In another aspect, the invention is directed towards a non-transitory computer-readable medium, including instructions for causing a computing device to implement the above method.

In a further aspect, the invention is directed towards a method of synchronizing the playback of a content item among a plurality of content playback devices, the content item available through a service provider requiring an affiliation process, including: coupling a plurality of content playback devices in data communication with a controller, the controller configured to at least partially control playback of a content item on the plurality of content playback devices through a service provider, the plurality of content playback devices constituting a synchronization group; sending a signal from the controller to each of the plurality to cause each of the plurality to contact the service provider to obtain access to the content item; in the event one of the plurality is not allowed access to the content item, then notifying the controller of the event and removing the one from the synchronization group; and sending a signal to each of the content playback devices in the synchronization group to begin playback of the content item.

Implementations of the invention may include one or more of the following. At least a portion of the plurality may be in data communication with a proxy device, and the sending a signal to cause each of the plurality to contact the service provider may include sending a signal to cause each of the portion of the plurality to contact the service provider through the proxy device. The proxy device may be a second display. The controller may configure the plurality of content playback devices for synchronized playback through a second display. The second display may indicate a list of content items for which access may be obtained by each of the plurality, or a list of content playback devices within the plurality that can obtain access to a given content item. The method may further include sending each of the content playback devices in the synchronization group a unique URL with which to access the content item. The method may further include: receiving data about device lag times associated with at least a first and a second content playback device in the plurality; calculating a time differential between a start time associated with the first content playback device and a start time associated with the second content playback device, the time differential at least partially based on the device lag times; and where the sending a signal to each of the content playback devices in the synchronization group to begin playback of the content item may include sending signals to the first and second content playback devices to begin playback of the content item, a time of each sending separated by the time differential.

In another aspect, the invention is directed towards a non-transitory computer-readable medium, including instructions for causing a computing device to implement the above method.

Advantages of certain implementations of the system and method may include one or more of the following. Synchronization of playback devices may lead to a significantly enhanced user experience, particularly when playback devices are in close proximity to each other. Device lags may be conveniently measured, and by having the device measure the lag, the timing used to overcome that lag will be accurate, leading to synchronization that is more precise than can be achieved by manually modifying timer settings through trial and error. Device lags may be accounted for from all sources, such as signal transmission, signal decoding, delays used to synchronize video and audio, lag due to the timing of when video frames are displayed, and the like.

Certain implementations allow playback devices to join in the playback of a content item in a synchronized fashion, without interrupting the original playback of the content item. Certain implementations further allow synchronized playback where clients are required to go through a management server infrastructure to play content, thus allowing synchronized playback in situations more complex than just the synchronization of direct networked media playback.

Other advantages will be apparent from the description that follows, including the figures and claims.

BRIEF DESCRIPTION OF THE DRAWINGS

Like reference numerals denote like elements throughout.

FIG. 11 illustrates an exemplary computing environment, e.g., that of the disclosed IPTV or client content playback device, management server, second display, or the like.

DETAILED DESCRIPTION

Figure 1:
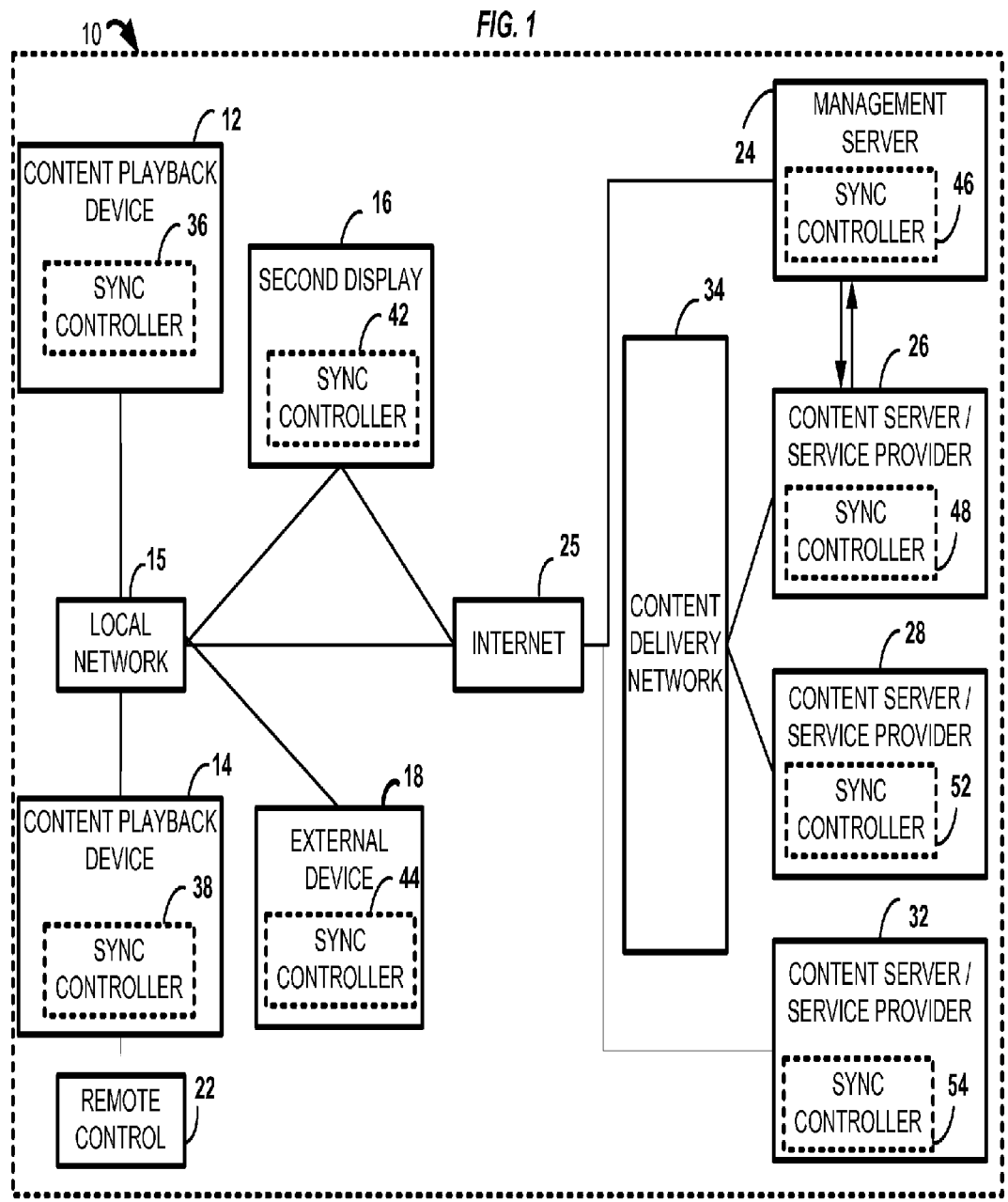
FIG. 1 is a block diagram of an exemplary system in accordance with an aspect of the present principles, illustrating a network which may be employed to deliver content in a synchronized fashion to multiple content playback devices using one or more controllers.

Referring to FIG. 1, a system 10 is shown including content playback devices 12 and 14 coupled to a local network 15, which may be wired, wireless, or a combination of both. A second display 16 is also illustrated on the local network 15 and the same may control the operation of the content playback devices (or other devices) on the local network. The second display 16 may in some cases also display content itself.

A remote control 22 may be employed to control the content playback device, or control may be exercised by way of the second display 16. The use of second display devices in such contexts has certain benefits because the same provides complementary functionality to the IPTV, but generally does not require additional investment by the user because the same make use of a device, e.g., a smartphone, tablet computer, or the like, which most users already have in their possession. Additional details about such second displays and their interactions with content playback devices, e.g., through proxy servers and otherwise, may be seen from Applicants' co-pending U.S. patent application Ser. No. 13/077,181, filed Mar. 31, 2011, entitled "PERSONALIZED SECOND DISPLAY BROWSING EXPERIENCE DUE TO MULTIPLE SESSION FEATURE", owned by the assignee of the present application and incorporated herein by reference in its entirety.

As illustrated in FIG. 1, a number of servers may be accessed by the content playback devices 12 and 14 through the local network 15 and the Internet 25, including a management server 24 and one or more content servers 26, 28, and 32 corresponding to content providers. In this specification, the term "content provider" is used synonymously with "service provider". The servers may communicate with a content delivery network 34 to enable content items to be delivered to the content playback devices, or such delivery may be direct.

In a general method, including use of a second display, a user has a user account with a source or clearinghouse of services. Here, the source or clearinghouse is represented as a management server, but it should be understood that the user account may be with a service provider directly. The management server communicates with at least one content server (generally associated with the service provider) such that the content server provides content items such as streaming assets for presentation or access at the content playback device. The user account has information stored thereon related to what content playback devices are associated with the user account. When a user logs on, they may see this list of content playback devices and may choose a particular content playback device. Once a content playback device has been chosen, a list of services may be displayed from which the user may choose. From a chosen service, a user may select a content item for viewing, undergoing an affiliation or authentication step if required by the service. Additional details may be found in the application incorporated by reference above.

A number of synchronization controllers 36-54, also termed just "controllers", are also illustrated. Controllers may be in one or all of the content playback devices, second displays, or servers controlling content delivery. In general, at least one controller is required, and the controller may be implemented in hardware, software, firmware, or the like. The controller can even be in an external device 18, devoted to controller functionality, or providing other functionality in addition to controller functions.

A typical situation represented by FIG. 1 would be a home, sports bar, and even locations such as gas pumps and grocery store checkout aisles. In such situations, a number of content playback devices may be in close proximity to each other. Differences in the timing of playback become noticeable and distracting. For example, if audio is produced by more than one of the devices, then users may experience an echo. With more serious offsets, they may experience two separate portions of the content competing with each other. Such dyssynchrony may be typical where content sources differ, e.g., satellite versus terrestrial, or even within separate models of playback devices. Generally, manually starting playback of a content item at the same time on two different devices cannot provide playback sufficiently close in time to avoid such difficulties. And tuning all of the playback devices to the same source signal does not work for the playback of network media.

Consequently, the controllers 36-54 are employed to coordinate such playback. All of the client devices participating in the synchronized playback establish data communication with a controlling device or controller that coordinates the playback timing across all participating clients. The controller can be one of the client devices, or it may be a separate device. Generally, some client devices will be capable of operating as controlling devices, and others will not.

Figure 2:
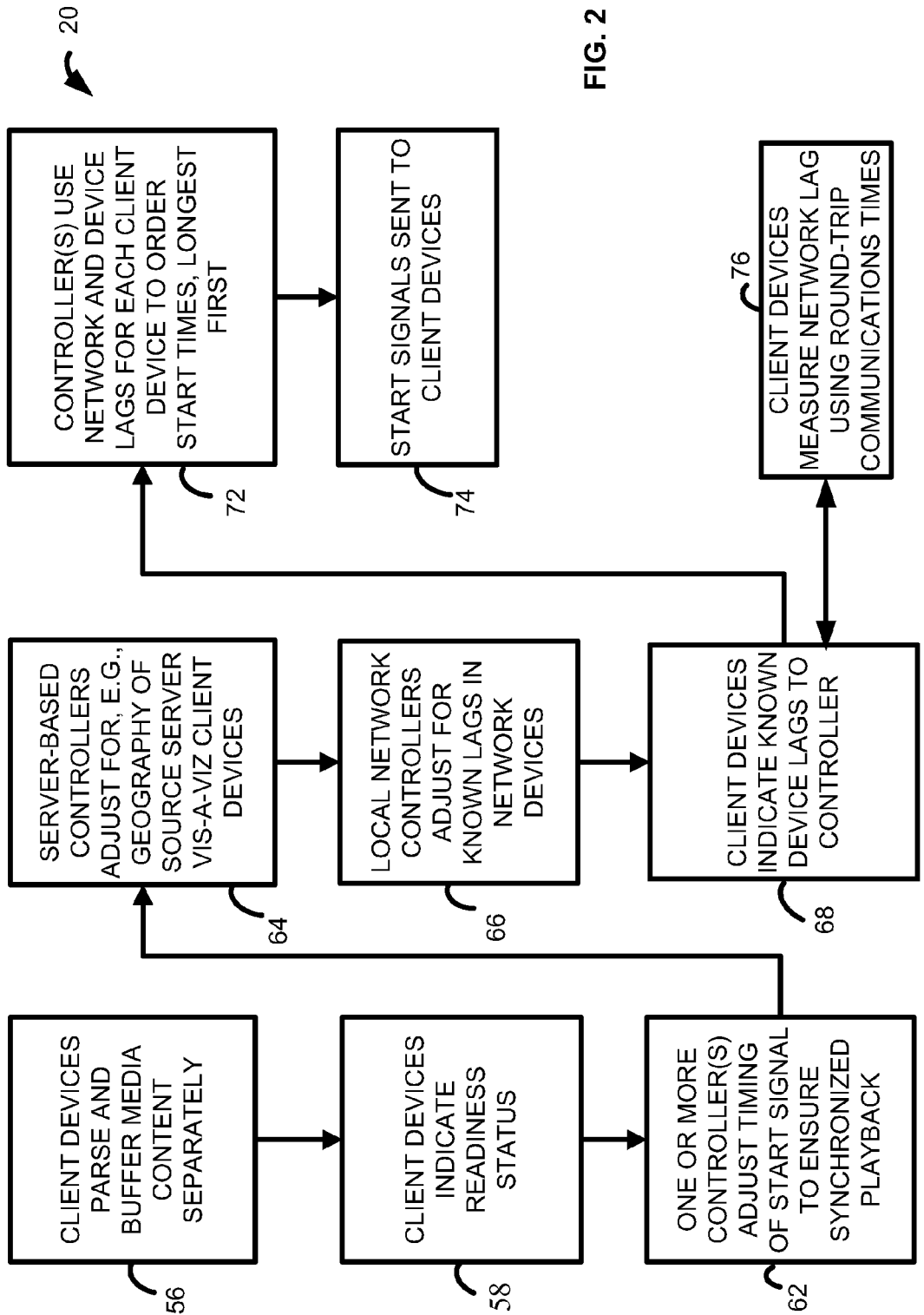
FIG. 2 is a flowchart illustrating an exemplary method according to another aspect of the present principles, the method for delivering a content item in a synchronized fashion using one or more controllers.

Referring to the flowchart 20 of FIG. 2, the individual content playback devices, e.g., devices 12 and 14, parse and buffer media content separately (step 56). The devices may get the media directly from the source, or they may obtain the media through a proxy device. For example, one of the client devices, or the controlling device, may operate as a proxy device and provide throughput or distribution of content in a manner described below, e.g., with respect to FIGS. 5-8. In the case where the network configuration allows multicast communications between the proxy device and the clients, the proxy may distribute the media to the clients using multicast communications to reduce the amount of bandwidth that is needed. The steps below may be performed when client devices have a degree of lag associated with them, e.g., either due to the network or due to device characteristics.

Once the content playback devices are ready to playback the content item, they signal their readiness to the controller (step 68), e.g., to controller 42 in the second display 16. In particular, once all of the content playback devices have decoded the index and header information they need and have buffered enough data such that they may start playback, their readiness is communicated to the controller. At this point, the client devices are waiting for a start signal to begin playback of the content item. Once the controller has received a signal from all clients indicating their readiness to begin playback, a start signal may be sent to each client to begin playback. Each client device should be in a state where playback may begin immediately or at a specified future time, so as to account for the local network lag of communications from the controller to all clients, upon receiving the signal from the controller. The controller 42 may adjust the timing of start signals (step 62) so that the output is displayed in synchronization on each client device. For example, the controller 42 may delay the sending of start signals based on the network lag of each client device, or may send all the start signals but indicate within the signal a respective delay after which playback should begin. In this latter alternative, all the playback devices have an opportunity to cache content while they are waiting through the delay.

A number of steps may be employed in determining the timing of the start signals. For example, if the controller is based at the server level, e.g., within the management server, the same may be aware of and account for differences in location of the service provider or source server relative to the client devices (step 64). In other words, some client devices may be located much closer to the source of content than others, and thus will experience less network lag or delay in receiving content.

Device lags may also be accounted for, such as the device lag between when a playback signal is generated and when that signal is actually displayed to the user. Such device lags may be measured using techniques described below, and in any case data about such lags may be communicated to the controller (step 66). Client devices may also employ a step of attempting to measure their network lag, and communicating the same to the controller (step 76), by measuring how long it takes for a test signal to traverse to a network location and back, e.g., to the management server.

Once data is obtained about network lags and device lags, the one or more controllers may use the data to order the start times at which signals will be sent to client devices to begin playback (step 72). For example, the controller may compensate for the differing lag times of the clients by giving a start command to the client with the most lag first and giving a start command to the other clients with enough delay so that the final display of the content will occur in a synchronized fashion. Once the ordering is done, and timing differentials calculated between the various start times, start signals may be sent to client devices (step 74).

Figure 3:
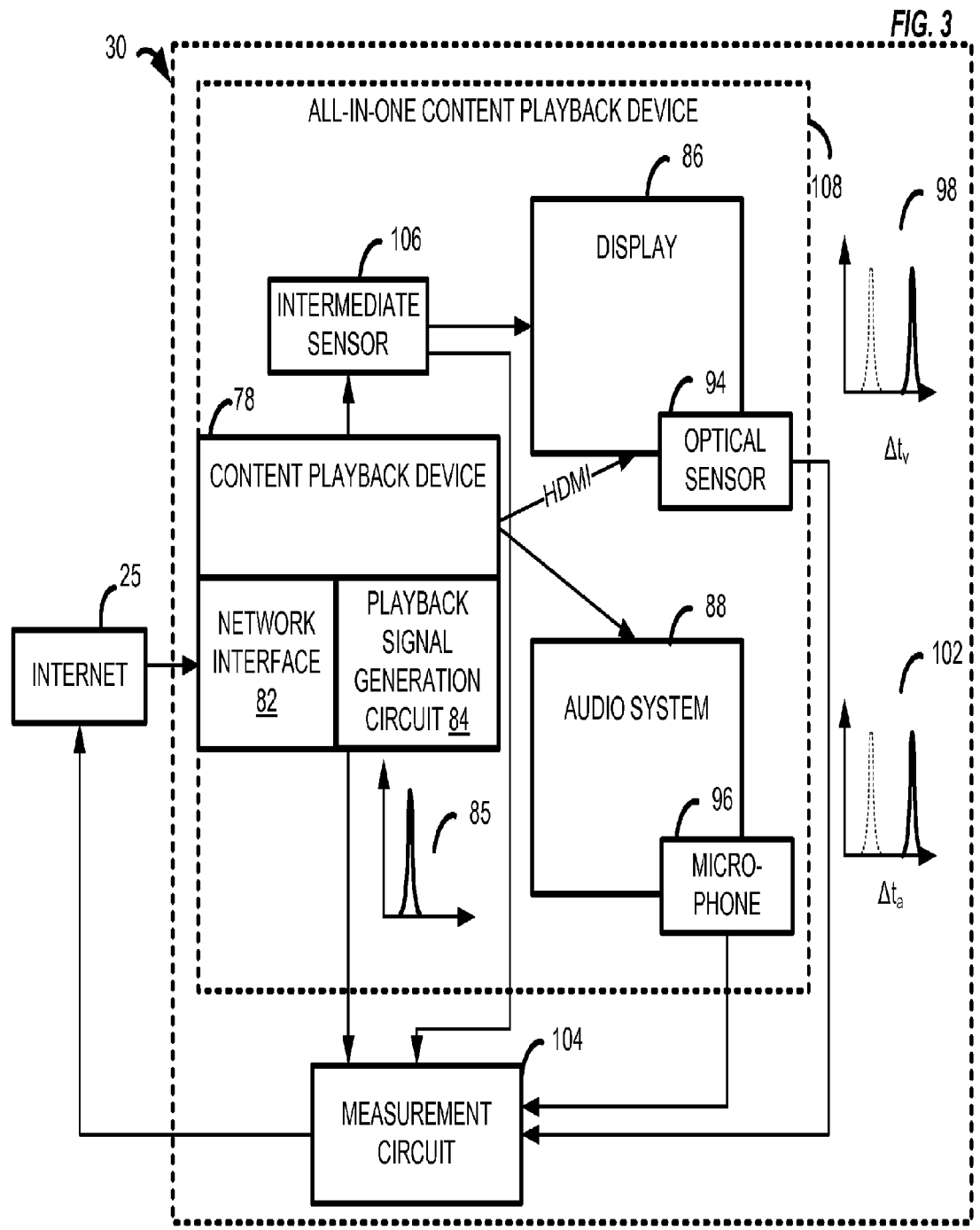
FIG. 3 is a block diagram of an exemplary system in accordance with another aspect of the present principles, illustrating a system for measuring a device lag for a content playback device.

Referring to the system 30 of FIG. 3, device lag times may be measured and used in calculations to provide for synchronized playback. It is noted in this connection that systems and methods according to the principles described here may be broadly applied to any combination of devices, and not just a particular content playback device. For example, some devices display their signals by outputting them, such as through an HDMI connector, and another device actually performs the display. The amount of lag depends thus on the combination of devices. Lag times can generally not be predetermined, as different TV models, even from the same manufacturer, may have different lag times between when they receive a digital input signal and when that signal is displayed to the user.

To adjust for this, the device of FIG. 3 may be employed. In FIG. 3, a content playback device 78 is shown having a network interface 82 that allows connection to service providers (not shown) through the Internet 25. The content playback device 78 is illustrated connected to a display 86 and an audio system 88. It will be understood, however, that such may form part of an integrated content playback device 108 that incorporates all of these subsystems.

The content playback device 78 includes a playback signal generation circuit 84 that accepts a start signal from the network interface 82 which generally originates from a controller. The start signal indicates that playback should begin. An exemplary playback signal is illustrated in the graph 85. Once the playback signal is generated, a finite amount of time $\Delta t$ passes before a user actually sees a corresponding signal on the display, illustrated as $\Delta t_v$, or hears a corresponding sound on the audio system, illustrated as $\Delta t_a$, in graphs 98 and 102, respectively. To determine these time differentials, an optical sensor 94, such as a camera, is disposed to receive displayed signals from the display 86. An audio sensor, such as a microphone 96, is disposed to receive rendered signals from the audio system 88. For example, a light detector may be placed in front of the display and a microphone in front of a speaker. The same provides signals to a measurement circuit 104, which also receives an indication of the playback signal 85 from the playback signal generation circuit 84. By measuring the time between the playback signal 85 and signals 98 and 102, a measurement of the device lag may be calculated.

It will be understood that the type of sensor may vary, and the only requirement is that they be positioned such that the same can detect the playback being output by the device. As audio is not highly directional, a built-in microphone may not need any special positioning if the device is located in the same room as the playback. A light intensity sensor or detector should be located so that the same is facing the screen where the video output is playing. Generally, such optical detectors should have a narrow field of vision and may employ shielding, such as a flat black tube, to reduce the amount of stray light from other angles being picked up by the sensor.

In general, the sensors need not be of any particular high-quality as the same only need to respond quickly to the overall intensity they are receiving. For example, inexpensive microphones, as are commonly used in telephones, will generally be sufficient for detecting overall sound intensity in real-time. For the light detector, any camera sensor may be employed, even those lacking optics necessary to produce a clear picture. The light detector may also simply detect overall light intensity and need not employ multiple pixels or be able to detect different intensities for different wavelengths of visible light.

The above system provides various advantages. For example, the system measures the overall lag, the same being a primary parameter required to synchronize the output. No matter how complex the signal processing pathway is, the overall result is measured. In this way, complex cases where significant signal processing exists may still be afforded synchronized playback, e.g., in professional broadcast environments where signals may be routed through many pieces of equipment. In this connection, it is noted that the measurement may be for a lag time through an arbitrary signal path, and may not necessarily include rendering of the signal at the end of the path. For such implementations, an intermediate sensor 106 may be employed to monitor the signal at the end of the signal path being measured, to look for timing when the generated signal reaches that point.

In variations of the above, the lag measurement may be automated such that device lags are automatically measured each time a change in signal path is detected, such as when a new device is attached to an HDMI output. Such automation may be provided in any of the embodiments described above.

Figure 4:
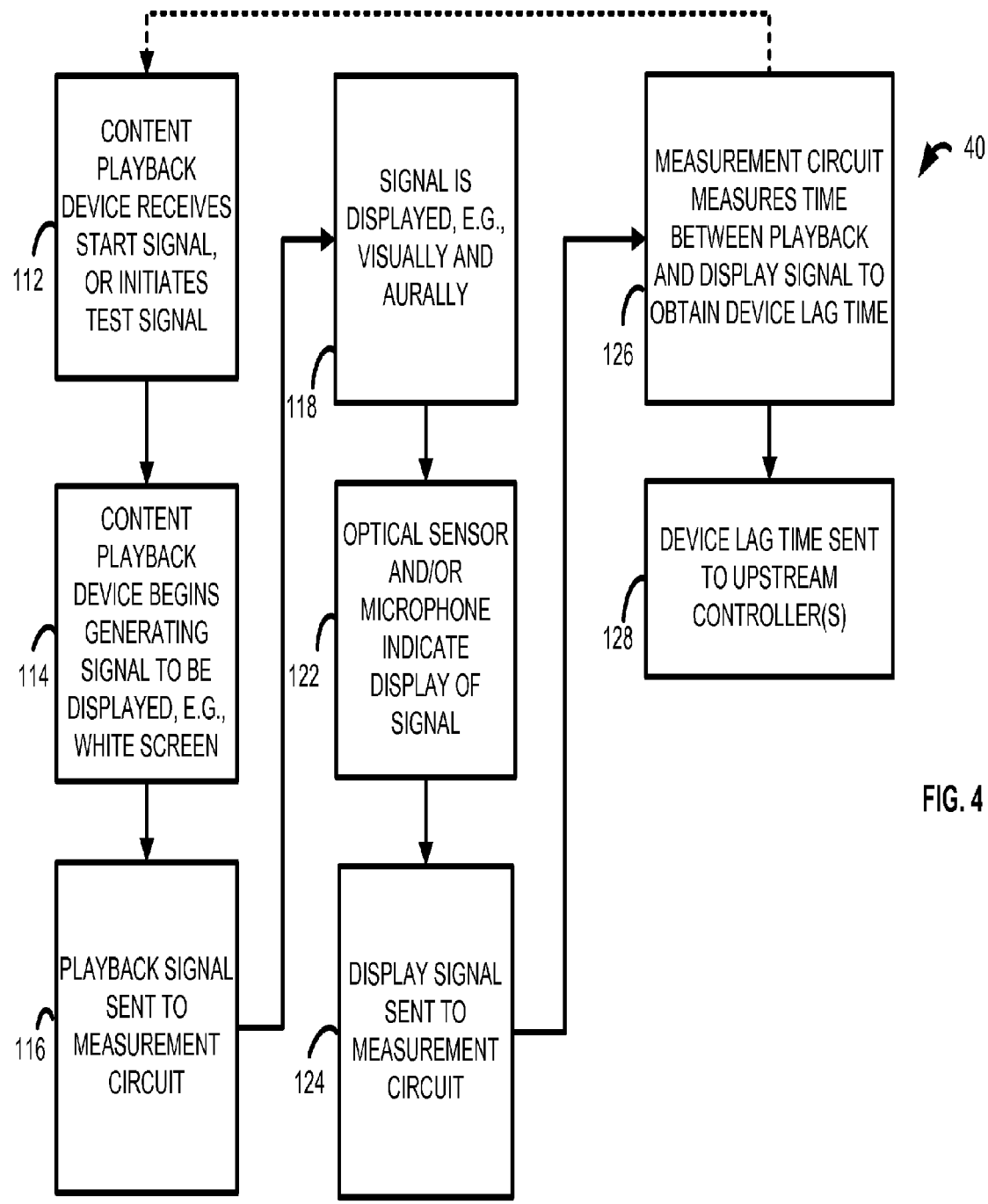
FIG. 4 is a flowchart illustrating an exemplary method according to another aspect of the present principles, the method for measuring device lags and delivering data about the same to one or more controllers.

A method that may be employed by the system of FIG. 3 is illustrated by a flowchart 40 in FIG. 4. A first step is that a content playback device receives the start signal, or may by itself initiate a test signal (step 112). For a light intensity sensor, the content playback device may begin by outputting a black video signal and then for the test signal output one or more white video frames (step 114). The test signal is sent to the measurement circuit (step 116) as well as to the actual display.

The test signal is then rendered, e.g., visually and/or aurally (step 118), and the same is detected by the optical sensor and/or microphone (step 122), respectively. Indication of receipt of the test signal is sent to the measurement circuit (step 124). The difference between the time of arrival of the start signal (or initiation of test signal) and the time of detection yields the lag time for the signal (step 126). This "device lag time" may then be sent to one or more controllers in data communication with the content playback device (step 128).

For a sound intensity sensor, the device may begin by outputting a silent audio signal and then outputting a loud signal. The audio signal that is used may vary, but should substantially immediately increase from silence to a steady volume. A single tone, such as a sine wave or square wave, can be used, or the output may include white noise. Musical outputs may be employed if the first note is of a sufficiently consistent loud amplitude. As with the optical detector, the lag may be calculated from the difference in timing from when the sound being output went from silence to the audio signal and when the sound intensity detector picked up the sudden increase in sound intensity.

The device may calculate the display lag using only one of the sensors, e.g. optical or audio, or it may use both. In the case where the device uses both, both measurements may occur simultaneously as they do not generally interfere with each other. It is noted that in such cases, the measurements of rendered signals may occur at different times. For example, if the audio and video synchronization of the output device is off, there may be a variation in the device lag for the audio and video outputs. In the case of a difference in device lag, the controller may employ different timings for the audio and video to compensate for that difference.

The measurements may be repeated, e.g., by cycling from low to high intensity several times, to ensure that the changes picked up were from the playback of the output and not from environmental interference. Statistical methods may be employed to ensure that enough points have been collected to obtain a true measurement.

Figure 5:
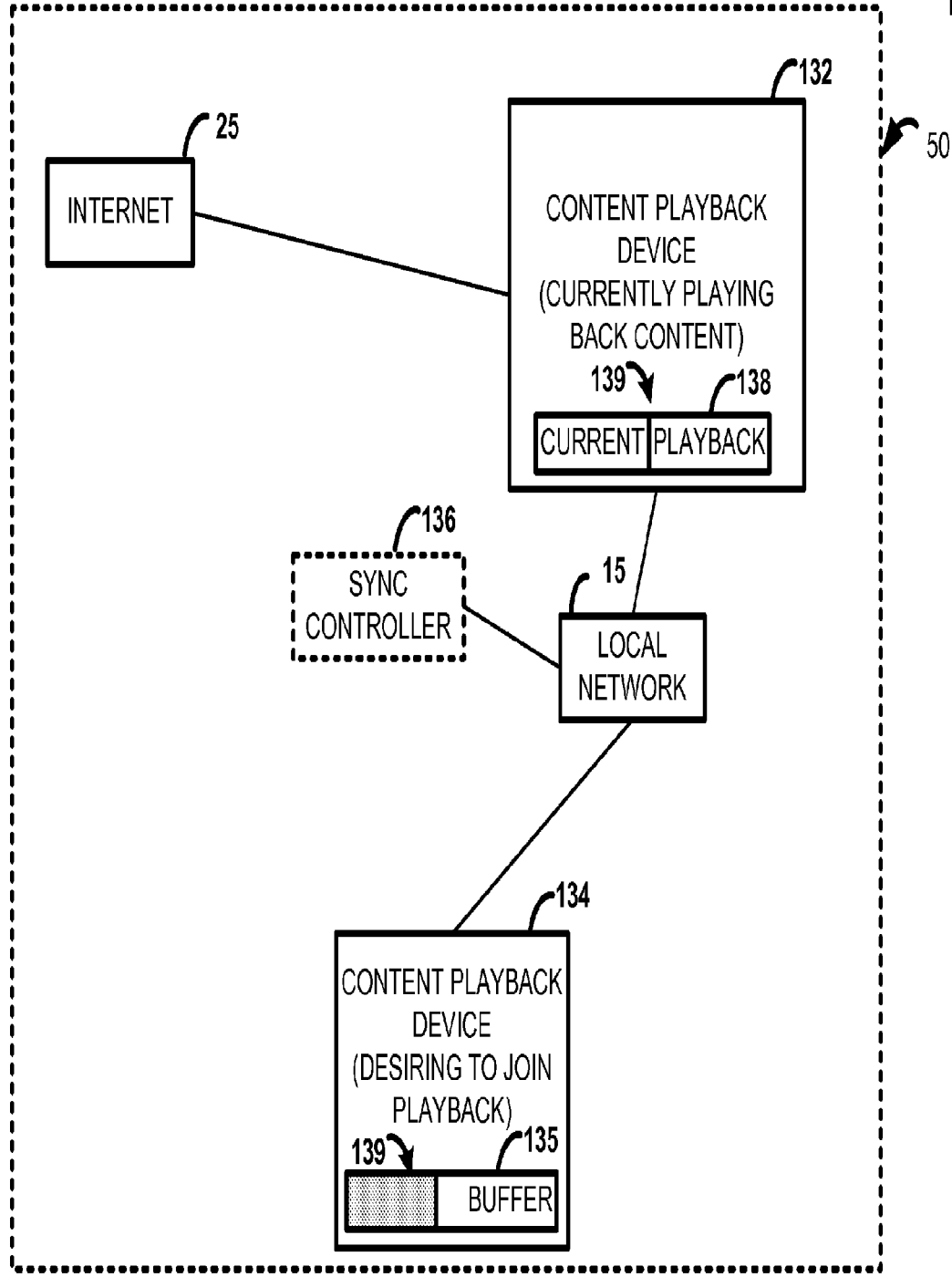
FIG. 5 is a block diagram of an exemplary system in accordance with another aspect of the present principles, illustrating a system in which a second content playback device may become synchronized with a first content playback device.

FIG. 5 illustrates another implementation according to the principles described here, this implementation of a system 50 in which a first content playback device 132 is currently playing back a content item 138 received or streaming from a service provider through the Internet 25. In the playback by the first content playback device 132, a playback point 139 has been reached in the content item 138.

A second content playback device 134 is illustrated, and the second content playback device has been indicated as desiring to join the playback of the content item 138. The first and second content playback devices 132 and 134, respectively, are illustrated as part of the local network 15. It will be understood that there is no requirement the two are on the same local network. In addition, a separate synchronization controller 136 is illustrated, and the same may form a portion of the second display, may form a portion of either content playback device, or may be a separate device entirely.

The second content playback device 134 has a buffer 135 and upon indication that the second content playback device wishes to join the playback of the first, the buffer 135 may begin to receive the content item through the Internet and/or the local network.

Figure 6:
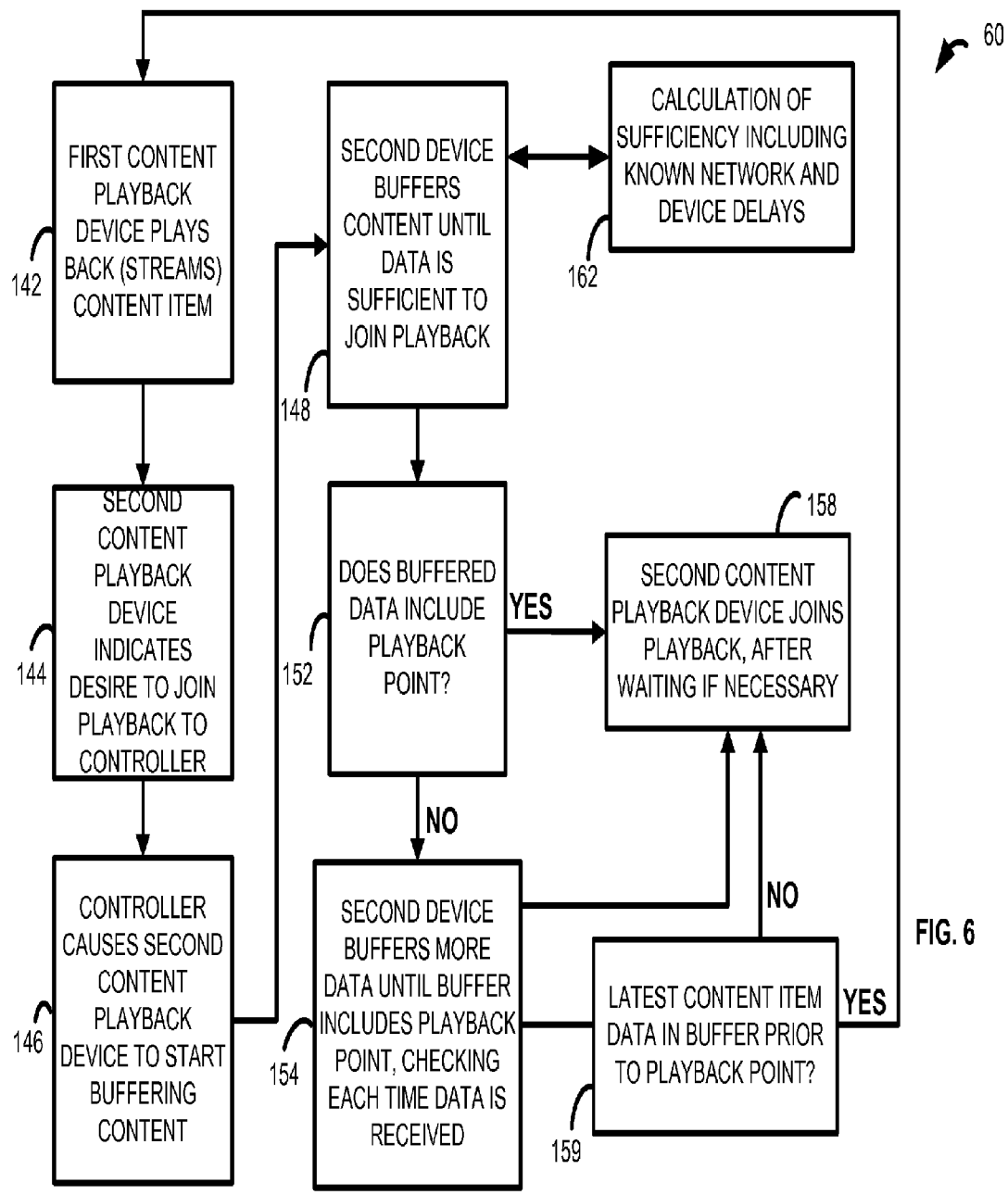
FIG. 6 is a flowchart illustrating an exemplary method according to another aspect of the present principles, the method for synchronizing a second content playback device with a first content playback device.

FIG. 6 illustrates a flowchart 60 for a method employing the system of FIG. 5. In a first step, the first content playback device plays back or streams the content item (step 142). A second content playback device indicates a desire to join the playback of the content item, and indicates this desire to a controller (step 144). In so doing, the second content playback device may communicate with the controller to obtain the current playback timing. In this process, the first content playback device also communicates its playback point in the content item to the controller. The client and controller may employ knowledge of the network and device lags, such knowledge gained using techniques described elsewhere in this application, to predict how long it will take to buffer to the point where playback can begin in a synchronized fashion. The second content playback device may calculate at which point in the content item data the playback will be that far into the future, and may load any header or index data it needs for that part of the content item. Once the header and index data are loaded, the second content playback device may update its bandwidth estimate and therefore the estimate of what part of the content item data will be needed at the point in time when the second content playback device has managed to buffer enough data to start playing.

In particular, the controller causes the second content playback device to begin buffering content (step 146), starting with the portion of the content item data that it estimates will contain the portion that will be played at the point in time when it has buffered enough data to start playing e.g., at a first target point. The second content playback device buffers the content until it has sufficient to join the playback (step 148). In so doing it may employ data about known network and device lags and delays (step 162).

Once the second content playback device has buffered enough data to start playback, it may then compare the portion of data it has with the current playback point, e.g., point 139. Additional communication with the controller may be made during buffering to double check that the playback timing information received by the second content playback device is still correct and was not affected by, e.g., abnormally high network lag on the part of either or both content playback devices or other such interruptions. If buffering happened quickly and the playback point has not yet reached the start of the content being buffered, the second content playback device may wait until the playback position reaches the playback point, and then begin playing the beginning of the content it has buffered (step 158).

If the current playback point has already passed the beginning of the data that was buffered, the client may determine at what point the current playback is, within the buffered data, and will check to see if there is adequate data buffered beyond that to start playback at that position. If there is sufficient data, then playback begins at the position within the data that corresponds with the current playback point. If there is not enough data buffered, playback will not begin at this point, and the client will continue to buffer the media (step 154), repeating the check each time a new segment of content item data is received. Once enough data is received, such that the buffer includes the playback point, the second content playback device may join the playback (step 158).

In some cases, a sufficiently disruptive network interruption may occur. In this case, the latest data in the buffer may be behind the current playback point, in which case the second content playback device may start over from the beginning with its attempt to begin synchronized playback (step 159).

The system and method of FIGS. 5 and 6 may be employed in a number of scenarios, including where, if existing devices are not in synchronization, one or more may attempt synchronization by following the steps that devices, that are newly joining the playback, will perform. Where multiple devices are joining a playback of the content item, the network and device lags pertaining to each may be employed by the controller in calculating when to send start signals to the multiple devices to begin playback. The above techniques may be employed to synchronize the playback of live streaming content, even if there is no existing playback with which to synchronize, as a current playback location for a live media stream is constantly changing, just as when playback of network media already exists. In another implementation, a device that loses network connectivity can rejoin synchronized playback when it regains network connectivity. By following the steps described above, i.e., that a new client would employ, synchronized playback may be again obtained. In some cases, the device that lost connectivity may have certain relevant content item data buffered that it may take advantage of to reduce the amount of data needed to download before playback can begin again.

Figure 7:
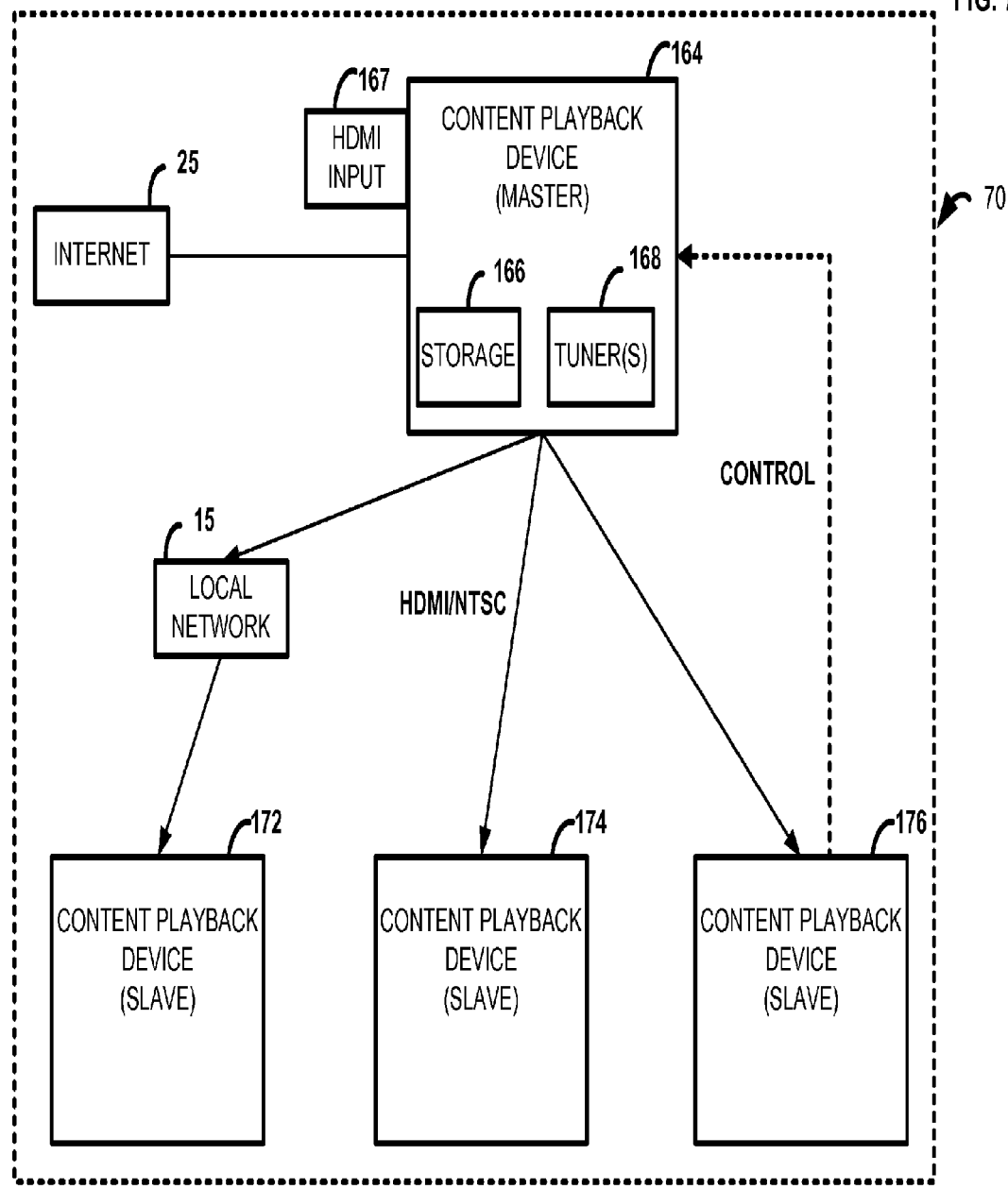
FIG. 7 is a block diagram of an exemplary system in accordance with another aspect of the present principles, illustrating a system in which a content playback device serves as a master device and one or more content playback devices serve as slave devices.
Figure 8:
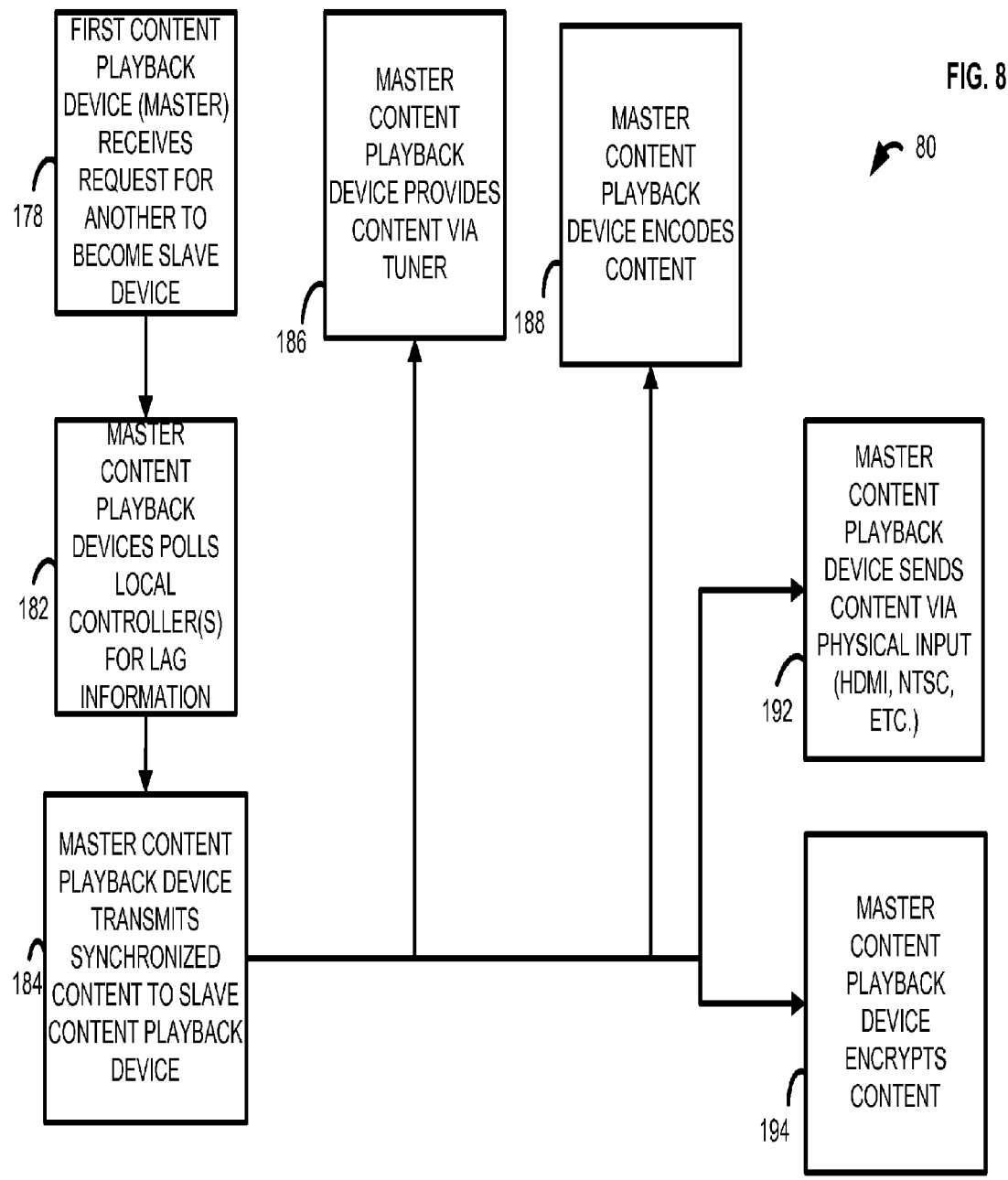
FIG. 8 is a flowchart illustrating an exemplary method, which may be employed in the system of FIG. 7, to create a master/slave relationship among two or more devices.

In some cases of synchronization, it may be desired to set up a direct relationship such that one content playback device acts as a master device and another a slave. Systems and methods according to the principles described here, in particular with respect to FIGS. 7 and 8, provide functionality to transmit content over a network to other devices, e.g., from masters to slaves. The devices have the ability to receive this content through their network connections from other devices, and play back that content in a synchronized manner. In this way, the output of the slave device is configured to be the same content as the output of the master device, generally, though not in every implementation, with synchronization.

For example, referring to FIG. 7, the system 70 includes a master content playback device 164, which receives content from the Internet 25, and three slave content playback devices 172, 174, and 176. The master content playback device 164 is coupled to the slave content playback device 172 through the local network 15. The slave content playback devices 174 and 176 are driven directly from the master content playback device 164, such as through an HDMI or NTSC connection. The master content playback device 164 may itself generate content items through one or more tuners 168, or the same may be stored in a storage 166. The storage 166 may be employed to store content items that are then output to clients. Such allows functionality like that of a DVR, e.g., trick play including pause, rewind, and fast-forward. Such commands may need to originate with the master device, or may come from one or more client devices, depending on how the settings are configured. If the master device generates the content, then the same can display such content from the media data in memory, in which case the quality may be degraded if that data is more compressed then the source media. Where the master content playback device is, e.g., a Blu-ray® player, playing a disc, that internally-generated content item can be the source signal that all slave devices play back.

The master content playback device may also receive content items from another device, such as through an HDMI input 167. Where the input is a protected signal, as through an HDMI connection, the master content playback device may need to encrypt the transmitted signal to the slave content playback device in order to ensure continued protection of the signal. Moreover, the master may need to encode the source material for transmittal to the slave device over the network if the source is not already in a suitable format. In some cases, the encoding may employ stronger compression, based on the available bandwidth between the master and the slave device.

Referring to the flowchart 80 of FIG. 8, in which an exemplary method of use is described for the system 70 of FIG. 7, a first step is that a first content playback device receives a request for another to become a slave device (step 178). For example, a user of one device may wish to view content displayed on another device, and so the one device becomes the slave of the other. A next step is that the master content playback device may poll a local or network controller for information about device and network lags (step 182). Such information once received allows the master playback device to provide for synchronization, if such synchronization is called for by the application, e.g., where several devices will be in close proximity.

The master content playback device then transmits the synchronized content to the slave content playback device (step 184). Such may be done immediately if no lags are expected, or with delays or lags to accommodate for such as has been described above.

The transmission of synchronized content may have a number of variations associated. For example, the master content playback device may provide content using one or more internal tuners (step 186). The master content playback device may encode content (step 188) to ensure that slave content playback devices can use the content. The master content playback device may further encrypt the content if required by the system (step 194). In yet other implementations, the master content playback device may send the content using a physical input, e.g., HDMI, NTSC, etc.

Other variations will also be seen. For example, and as indicated in FIG. 7, a master device may have more than one slave device synchronized. The content output by the slave device may be the same content that is output by the master device, regardless of the source. Provision may be made for the ability to control which content the master device is sending to a client device through the client device's user interface.

In some implementations, one or more slave content playback devices may be given permission to control the master content playback device. In this case, the slave device may be enabled to issue control commands to the master, such as to change the channel or to switch to an external input. The master device may execute these commands, which may change what is being displayed, and therefore what is being sent to all the subscribed client or slave devices. The master content playback device may have privacy settings configured to allow the user to allow all client connections, disallow all client connections, allow only certain clients to connect, or allow clients to connect only if they supply proper authentication credentials. Other such settings will also be understood.

It is noted that the master device need not display the content that it supplies to the client or slave device. This allows slave devices to access external inputs, e.g., a TV tuner, disc player, or other content source in the master device, even if there is no desire for the master device to also display that content. The master device may display other content while supplying the desired content or the master device may have the display portion of its circuitry in an off state to conserve power. In some implementations, the master device may supply more than one separate content stream to its connected slave or client devices. It is further noted that a particular content playback device may act as a master device relative to some devices, and as a client to others, even at the same time.

In some implementations, the user may or may not be concerned about the synchronization of the playback between the master device and the slave device, or between a plurality of slave devices. For example, where devices are not in close proximity, such synchronization is not necessary. Where synchronization is employed, the master content playback device may need to delay the playback of its own signal relative to when it transmits a signal to one or more slave devices to account for lag in the transmission of the signal and the processing of the signal by the slave devices. Each device would generally add enough delay so that the content item would be played at the same playback point as the device with the most lag would play the same with no delay.

It is understood that the term "display" is interpreted to be inclusive of playing an audio signal through speakers in the case where the media being played contains audio information, regardless of whether the media also contains video or image information. An audio device, such as a home audio receiver, may synchronize to a device with an audio and video signal, such as a TV, in which case the home audio device may only request and receive the audio portion of the information.

In another variation of the above implementations, if the slave devices that are subscribed to a master device are connected within the same local network, such that multicast network communications are enabled between the devices, the master device may choose to use multicast communications so that the content item data only needs to be transmitted once in a single stream, thus saving significant bandwidth over having to broadcast the same data in multiple separate communications to each client device.

In yet another implementation, systems and methods according to the principles described here relate to providing synchronized playback even when content playback devices must access management server infrastructures to access content, including undergoing affiliation and authentication procedures. For example, referring to the system 90 of FIG. 9, a first content playback device 196 is illustrated as part of a local network 15. A second display 198 is also illustrated as part of this network, and the second display may control aspects of the content playback device 196 using a user interface 199. The second display 198 further includes a synchronization controller 201, although, as disclosed above, such a controller may be disposed at various locations in the system. A second content playback device 206 is illustrated, and both the first and second content playback devices are in data communication with the Internet 25. The first and second content playback devices are not illustrated as being on the same local network, although in an alternative implementation, they may be so coupled.

Through the Internet 25, the first and second content playback devices 196 and 206, respectively, may communicate with a content or service provider 214 through, in some cases, a management server 212. For example, the management server 212 may arrange for the presentation of services and assets, including an asset 202 having an asset ID 202', on a user interface of the second display or content playback device. Users may browse content and identify assets through the use of the asset ID. The users of the content playback devices may select the asset 202 for playback, in which case the asset 202 from the service provider is downloaded and played back or streamed to the content playback devices. As noted in FIG. 1, the same may take place through a content delivery network, not shown in FIG. 9 for clarity.

Generally, to access content to a content or service provider, steps of affiliation are required to ensure access by a particular device is allowed and enabled. Steps of such affiliation processes are described in co-pending applications: U.S. patent application Ser. No. 13/077,298, filed Mar. 31, 2011, entitled "Direct Service Launch On A Second Display": U.S. patent application Ser. No. 13/207,581, filed Aug. 11, 2011, entitled "System And Method To Easily Return To A Recently Accessed Service On A Second Display": U.S. patent application Ser. No. 13/233,398, filed Sep. 15, 2011, entitled "System And Method To Store A Service Or Content List For Easy Access On A Second Display"; and U.S. patent application Ser. No. 13/217,931, filed Aug. 25, 2011, entitled "System And Method Providing A Frequently Accessed Service Or Asset List On a Second Display"; all of which are owned by the assignee of the present application and herein incorporated by reference in their entireties.

Figure 9:
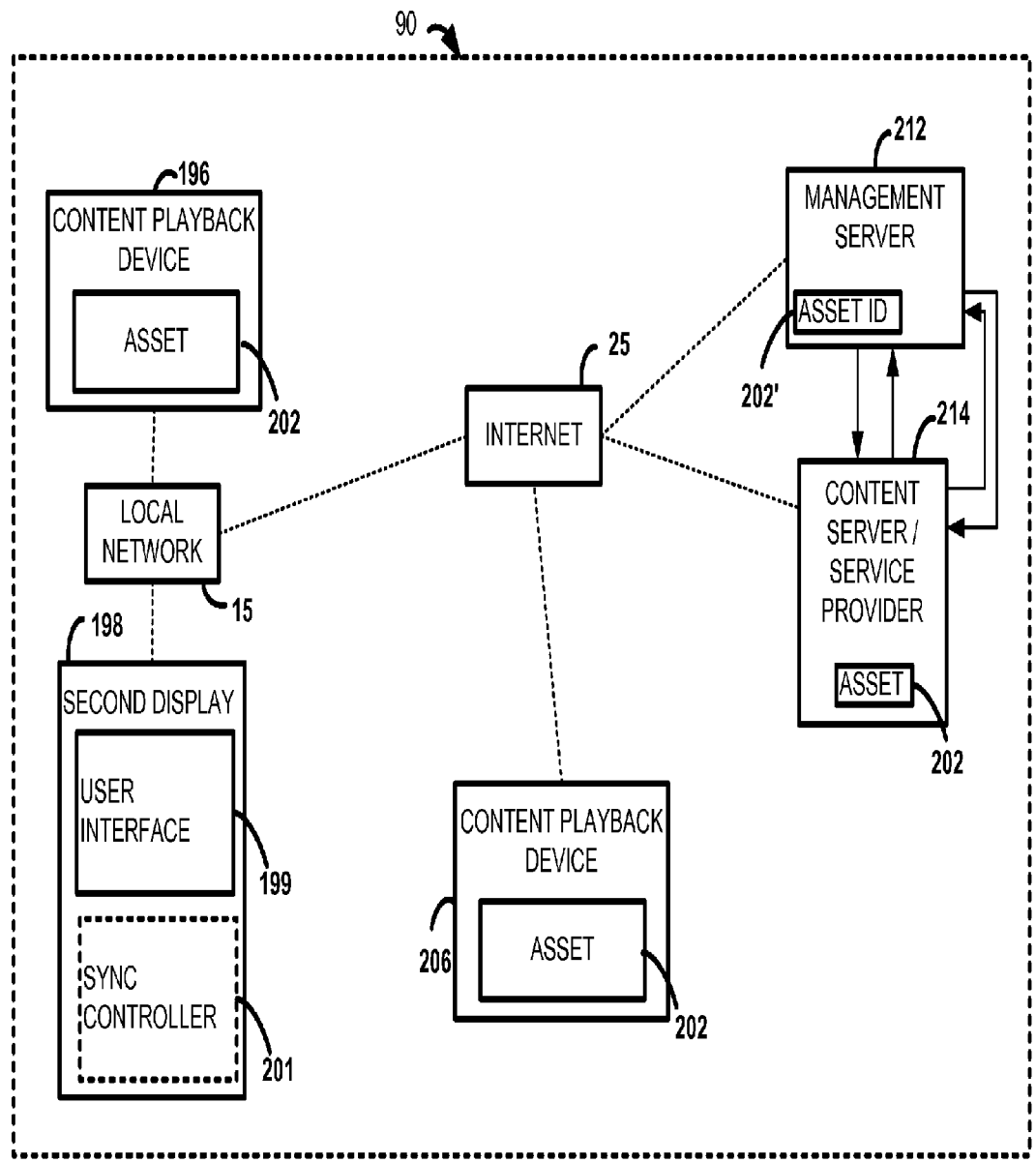
FIG. 9 is a block diagram of an exemplary system in accordance with another aspect of the present principles, illustrating a network which may be employed to deliver content in a synchronized fashion to multiple content playback devices where content is delivered within an infrastructure including a management server and a service provider.
Figure 10:
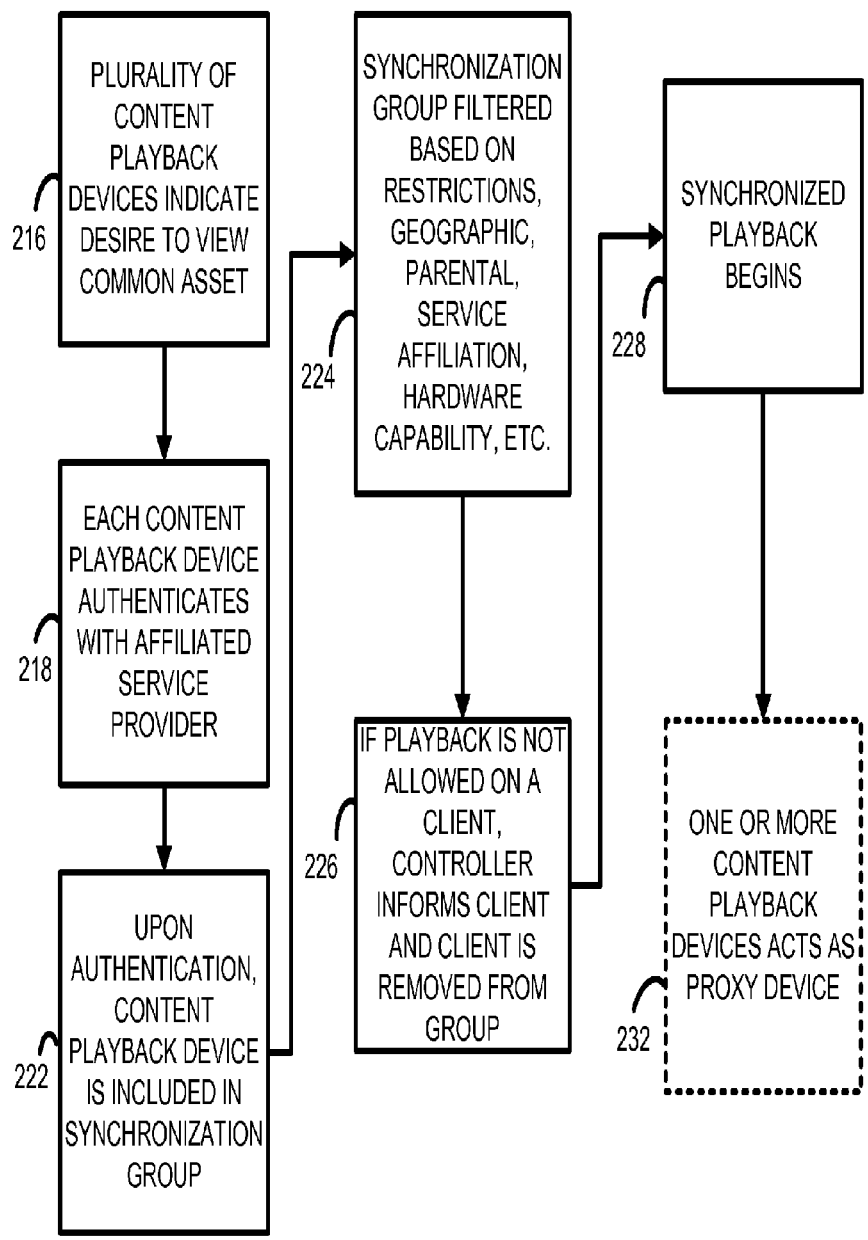
FIG. 10 is a flowchart illustrating an exemplary method according to another aspect of the present principles, the method for delivering a content item in a synchronized fashion to multiple content playback devices where content is delivered within an infrastructure including a management server and a service provider.

In systems and methods according to FIGS. 9 and 10, multiple devices are signaled to start playback of the same asset ID. Each client content playback device accesses the management server and/or service provider to obtain the location of the media to play. The same authenticate each content playback device, to ensure that the same is authorized to view the content. The authorization may be withheld in such cases as when the client device does not have the capability to play the media, such as due to a hardware limitation or no software support for the codec which encoded the content item. The system may also restrict the client from playing back content if the client has a rating limit set that would cause the content playback to be blocked on that client. If playback is not allowed on one or more clients, those clients can inform the controller, which may remove them from a synchronization group and continue with the remaining clients. The controller may also choose to treat such disallowance as an error condition, reporting or logging it, as configured, and aborting the playback. In this system, each client would make its own request to the service provider to obtain the media data to play. Depending on how the system is configured, a proxy device may be employed to reduce the number of requests made to the service provider, e.g., one of the content playback devices may act as a proxy device.

In more detail, and referring to a flowchart 100 in FIG. 10, a first step is that a plurality of content playback devices indicate a desire to view a common asset (step 216). Each content playback device authenticates and affiliates with the service provider (step 218). For example, each content playback device may establish a session with a management server by logging in, and may further login to the service provider site (in many cases done automatically), providing authentic IPTV credentials to enable a content item to be delivered to the particular content playback device. Upon authentication, the content playback device is included in the synchronization group which will view the common asset in a synchronized fashion (step 222).

The synchronization group may then be filtered based on various factors, if such filtering has not been performed at the authentication step (step 224). Examples of such factors include that certain content may employ differing formats that may require hardware support of codec software that is not available on all clients. Another factor may be that some content distribution licenses only allow the content to be displayed in certain geographical regions. Another factor that may prevent playback is if a device has a rating limit set that would prevent the playback of the content item with the given rating. If playback is not allowed on the client, the controller informs the client and the client is removed from the synchronization group (step 226). Synchronized playback may then begin, as arranged and coordinated by the controller (step 228), with each client device obtaining and using its own unique URL to access the media.

Variations of the above system and method will be understood given the teaching therein. For example, combinations of the above synchronization techniques may be employed. As another example, if a source device obtains content to play from a service provider, that source device may use the service provider as it would any other content source and transmit the content item to any subscribed client devices as noted above with reference to FIGS. 7 and 8. In this situation, the subscribed client devices need not be capable of operating as clients of the service provider. The source device may if necessary re-encode the media to a format that can be passed to the client devices.

Where a second display controls playback, the second display may operate software that allows the same to choose from a plurality of target devices for playback. The content navigation on the second device may indicate which content is playable by each device that is currently targeted for playback, or may even filter the content choices presented to the user to ensure that the user can only see and choose from content that can be played on all targeted devices. If playback is initiated by a second display, then the second display can designate one of the content playback devices to be the controller, in which case the content playback devices to be synchronized establish communication between themselves to synchronize with the controller content playback device. Also if playback was initiated by a second display device, the second display device may act as the controller even though it is not one of the playback devices, in which case the content playback devices to be synchronized communicate with the second display device. The content playback devices may address their communications directly to the controller or may communicate to an external server that is in data communication with all.

Systems and methods have been disclosed that allow improvement of the user experience of the IPTV without adding to the hardware costs of the unit. As disclosed above, users may employ the system and method to playback content in a synchronized fashion, allowing enjoyment of content items without the disadvantages suffered by prior attempts at coordinated playback.

Figure 11:
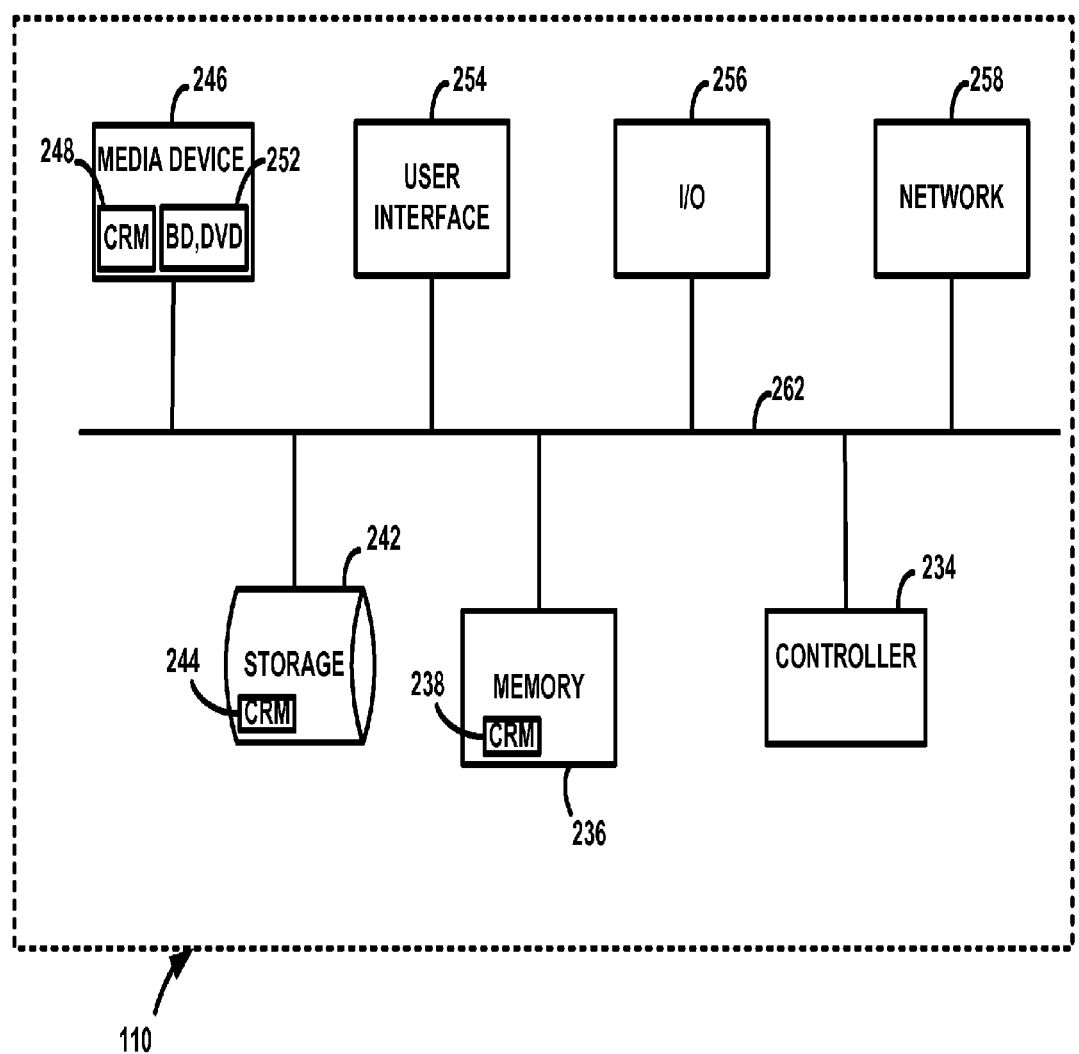

One implementation includes one or more programmable processors and corresponding computing system components to store and execute computer instructions, such as to execute the code that provides the various server functionality, e.g., that of the management server or content server, second display, or content playback device. Referring to FIG. 11, a representation of an exemplary computing environment 110 for a server, second display, content playback device, or other such computing device is illustrated.

The computing environment includes a controller 234, a memory 236, storage 242, a media device 246, a user interface 254, an input/output (I/O) interface 256, and a network interface 258. The components are interconnected by a common bus 262. Alternatively, different connection configurations can be used, such as a star pattern with the controller at the center.

The controller 234 includes a programmable processor and controls the operation of the servers, second displays, content playback devices, controllers, and their components. The controller 234 loads instructions from the memory 236 or an embedded controller memory (not shown) and executes these instructions to control the system.

Memory 236, which may include non-transitory computer-readable memory 238, stores data temporarily for use by the other components of the system. In one implementation, the memory 236 is implemented as DRAM. In other implementations, the memory 236 also includes long-term or permanent memory, such as flash memory and/or ROM.

Storage 242, which may include non-transitory computer-readable memory 244, stores data temporarily or long-term for use by other components of the system, such as for storing data used by the system. In one implementation, the storage 242 is a hard disc drive or a solid state drive.

The media device 246, which may include non-transitory computer-readable memory 248, receives removable media and reads and/or writes data to the inserted media. In one implementation, the media device 246 is an optical disc drive or disc burner, e.g., a writable Blu-ray® disc drive 252.

The user interface 254 includes components for accepting user input, e.g., the user indications of streaming content items, and presenting service lists, asset lists and categories, and individual assets to the user. In one implementation, the user interface 254 includes a keyboard, a mouse, audio speakers, and a display. The controller 234 uses input from the user to adjust the operation of the computing environment.

The I/O interface 256 includes one or more I/O ports to connect to corresponding I/O devices, such as external storage or supplemental devices, e.g., a printer or a PDA. In one implementation, the ports of the I/O interface 256 include ports such as: USB ports, PCMCIA ports, serial ports, and/or parallel ports. In another implementation, the I/O interface 256 includes a wireless interface for wireless communication with external devices. These I/O interfaces may be employed to connect to one or more content playback devices.

The network interface 258 allows connections with the local network and optionally with content playback devices and second displays and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The servers, second displays, and content playback devices may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Aspects specific to certain computing environments are discussed below.

The content playback device can take many forms, and multiple content playback devices can be coupled to and selected from within a given local network. Exemplary content playback devices may include, e.g., an IPTV, a digital TV, a digital sound system, a digital entertainment system, a digital video recorder, a video disc player, a combination of these, or any number of other electronic devices addressable by a user on the local network 16 and capable of delivering an ad over the Internet. The same may also include more traditional video and audio systems that have been appropriately configured for connectivity. For the sake of simplicity, in this specification, the content playback device has generally been exemplified by an IPTV, in which case the same will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device may also be stored on various memories to undertake present principles. The processor can receive user input signals from various input devices including a second display, a remote control device, a point-and-click device such as a mouse, a keypad, etc. A TV tuner may be provided in some implementations, particularly when the content playback device is an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network. It will be understood that communications between the content playback device and the Internet, or between the second display and the Internet, may also take place through means besides the local network. For example, the second display may communicate with the content playback device through a separate mobile network.

The second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, Internet appliances, and also on devices specifically designed for these purposes, in which case the special device would include at least a processor and sufficient resources and networking capability to run the second display application. The second displays may each bear a processor and components necessary to operate an application for service provider and content selection. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on various memories to undertake present principles. The second display can receive user input signals from various input devices including a point-and-click device such as a mouse, a keypad, a touch screen, a remote control, etc. A network interface such as a wired or wireless modem communicates with the processor to provide connectivity to wide area networks such as the Internet 26 as noted above.

The servers, e.g., the management server and content server, have respective processors accessing respective computer-readable storage media which may be, without limitation, disk-based and/or solid state storage. The servers communicate with a wide area network such as the Internet via respective network interfaces. The servers may mutually communicate via the Internet. In some implementations, two or more of the servers may be located on the same local network, in which case they may communicate with each other through the local network without accessing the Internet.

Various illustrative implementations of the present invention have been described. However, one of ordinary skill in the art will recognize that additional implementations are also possible and are within the scope of the present invention. For example, service and asset choices may be made by a client device, i.e., a content playback device, e.g., an IPTV, or the same may also be made by a second display presenting appropriate authentication credentials to a management server, as disclosed in assignee's co-pending US patent applications incorporated by reference above.

The description above may pertain to any digital content, including streamed, live streaming, video-on-demand content, and stored digital content. Any type of digital content file is contemplated, including media files in live streaming formats, e.g., .m3u8 files. The terms "content item", "content", and "asset", have been used interchangeably, unless the context dictates otherwise.

In the system where master devices drive slave devices, the master device may provide to the slave device alternate versions of presented content, the alternate versions incorporating video of lower quality, different codecs, different subtitles, different captions, as well as alternate audio tracks such as descriptive audio for the blind, etc. Further in such systems, a master device may simultaneously transmit a plurality of content items to multiple content playback devices, instead of just a common content item. For example, the master device may receive network content or DVR content and transmit the same to one content playback device while the master device is simultaneously receiving content from a tuner and transmitting such tuner content to another content playback device. In a further implementation, it is noted that a content playback device may act simultaneously as both a master and a slave, connecting to two separate devices. The content that the master device is transmitting may be the content it is receiving or content from another source, such as a tuner, that it has access to.

Not all steps described above (or in any of the flowcharts below) need be undertaken in any particular implementation, and the order of steps may vary to a certain extent as well.

Accordingly, the present invention is not limited to only those implementations described above.

The invention claimed is:

1. A method of synchronizing the playback of a content item among a plurality of content playback devices, the content item available through a service provider requiring an affiliation process, comprising:
   a. coupling a plurality of content playback devices in data communication with a controller, the controller configured to at least partially control playback of a content item on the plurality of content playback devices through a service provider, the plurality of content playback devices constituting a synchronization group;
   b. sending a signal from the controller to each of the plurality to cause each of the plurality to contact the service provider to obtain access to the content item;
   c. in the event one of the plurality is not allowed access to the content item, then notifying the controller of the event and responsive to the notifying, the controller removing the one from the synchronization group; and
   d. sending a signal to each of the remaining content playback devices in the synchronization group to begin playback of the content item, such that the one of the plurality that is not allowed access does not receive a signal to begin playback;
   e. receiving data about device lag times associated with at least a first and a second content playback device in the plurality;
   f. calculating a time differential between a start time associated with the first content playback device and a start time associated with the second content playback device, the time differential at least partially based on the device lag times; and
   g. wherein the sending a signal to each of the content playback devices in the synchronization group to begin playback of the content item includes sending signals to the first and second content playback devices to begin playback of the content item, a time of each sending separated by the time differential.

2. The method of claim 1, wherein at least a portion of the plurality are in data communication with a proxy device, and wherein the sending a signal to cause each of the plurality to contact the service provider includes sending a signal to cause each of the portion of the plurality to contact the service provider through the proxy device, such that the content item is obtained at least in part by throughput through the proxy device.

3. The method of claim 2, wherein the proxy device is a second display.

4. The method of claim 1, wherein the controller configures the plurality of content playback devices for synchronized playback through a second display.

5. The method of claim 4, wherein the second display indicates a list of content items for which access may be obtained by each of the plurality, or a list of content playback devices within the plurality that can obtain access to a given content item.

6. The method of claim 1, further comprising sending each of the content playback devices in the synchronization group a unique URL with which to access the content item.

7. A non-transitory computer-readable medium, comprising instructions for causing a computing device to implement the method of claim 1.

8. A method of synchronizing the playback of a content item among a plurality of content playback devices, the content item available through a service provider requiring an affiliation process, comprising:
   a. coupling a plurality of content playback devices in data communication with a controller, the controller configured to at least partially control playback of a content item on the plurality of content playback devices through a service provider, the plurality of content playback devices constituting a synchronization group;
   b. sending a signal from the controller to each of the plurality to cause each of the plurality to contact the service provider to obtain access to the content item;
   c. in the event one of the plurality is not allowed access to the content item, then notifying the controller of the event and removing the one from the synchronization group;
   d. sending a signal to each of the remaining content playback devices in the synchronization group to begin playback of the content item, such that the one of the plurality that is not allowed access does not receive a signal to begin playback;
   e. receiving data about device lag times associated with at least a first and a second content playback device in the plurality;
   f. calculating a time differential between a start time associated with the first content playback device and a start time associated with the second content playback device, the time differential at least partially based on the device lag times; and
   g. wherein the sending a signal to each of the content playback devices in the synchronization group to begin playback of the content item includes sending signals to the first and second content playback devices to begin playback of the content item, a time of each sending separated by the time differential.

9. The method of claim 8, wherein at least a portion of the plurality are in data communication with a proxy device, and wherein the sending a signal to cause each of the plurality to contact the service provider includes sending a signal to cause each of the portion of the plurality to contact the service provider through the proxy device, such that the content item is obtained at least in part by throughput through the proxy device.

10. The method of claim 9, wherein the proxy device is a second display.

11. The method of claim 8, wherein the controller configures the plurality of content playback devices for synchronized playback through a second display.

12. The method of claim 11, wherein the second display indicates a list of content items for which access may be obtained by each of the plurality, or a list of content playback devices within the plurality that can obtain access to a given content item.

13. The method of claim 8, further comprising sending each of the content playback devices in the synchronization group a unique URL with which to access the content item.

* * * * *